United States Patent
Hund et al.

(10) Patent No.: US 7,710,641 B2
(45) Date of Patent: May 4, 2010

(54) TUBE FOR A MICROSCOPE

(75) Inventors: Andreas Hund, Gleichen-Reinhausen (DE); Klaus Hermanns, Asslar (DE); Peter Euteneuer, Lahnau (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 0 days.

(21) Appl. No.: 10/752,258

(22) Filed: Jan. 6, 2004

(65) Prior Publication Data

US 2004/0190128 A1 Sep. 30, 2004

(30) Foreign Application Priority Data

Jan. 7, 2003 (DE) ................................. 103 00 455

(51) Int. Cl.
*G02B 21/00* (2006.01)
(52) U.S. Cl. ...................................... 359/384; 359/368
(58) Field of Classification Search ................. 359/368, 359/384
See application file for complete search history.

(56) References Cited

U.S. PATENT DOCUMENTS

| | | | | |
|---|---|---|---|---|
| 4,175,826 A * | 11/1979 | Blaha et al. | ................. | 359/377 |
| 4,576,450 A * | 3/1986 | Westphal | .................... | 359/384 |
| 4,691,997 A * | 9/1987 | Muchel | ........................ | 359/364 |
| 5,015,081 A * | 5/1991 | Kitajima et al. | ............. | 359/375 |
| 5,144,478 A * | 9/1992 | Toshimitsu | ................. | 359/392 |
| 5,519,531 A * | 5/1996 | Sato | ............................. | 359/380 |
| 5,543,962 A * | 8/1996 | Kitajima et al. | ............. | 359/384 |
| 5,657,158 A | 8/1997 | Baumann et al. | ............ | 359/363 |
| 5,764,408 A | 6/1998 | Otaki | .......................... | 359/368 |
| 5,847,866 A * | 12/1998 | Otaki | .......................... | 359/368 |
| 5,907,432 A * | 5/1999 | Hayasaka | .................... | 359/384 |
| 6,088,155 A * | 7/2000 | Tandler et al. | .............. | 359/381 |
| 6,097,538 A * | 8/2000 | Watanabe et al. | ........... | 359/390 |
| 6,188,515 B1 * | 2/2001 | Nihoshi | ....................... | 359/384 |
| 2001/0030801 A1 * | 10/2001 | Kawasaki | ................... | 359/384 |
| 2003/0133187 A1 * | 7/2003 | Schmidt et al. | ............. | 359/376 |
| 2004/0141231 A1 * | 7/2004 | Hund et al. | ................. | 359/384 |

FOREIGN PATENT DOCUMENTS

| | | | |
|---|---|---|---|
| EP | 0844505 | | 5/1998 |
| JP | 61-294408 | | 12/1986 |
| JP | 2000098237 A | * | 4/2000 |

OTHER PUBLICATIONS

European Search Report for EP 03 10 4659 of Aug. 18, 2004 and brief translation, 3 pages.

* cited by examiner

*Primary Examiner*—Alessandro Amari
*Assistant Examiner*—Mark Consilvio
(74) *Attorney, Agent, or Firm*—Darby & Darby

(57) ABSTRACT

A tube for a microscope includes an adaptation interface, a rotatable operator interface, a beam deflecting device, and a rotatable beam deflecting unit. The beam deflecting device includes a beam-splitting device. A rotation of the operator interface is constrainedly coupled to a rotation of the beam deflecting unit. The beam deflecting device deflects, in the direction of the beam deflecting unit, a light beam coming from the adaptation interface.

22 Claims, 1 Drawing Sheet

TUBE FOR A MICROSCOPE

This application claims priority to German patent application 103 00 455.6, the subject matter of which is hereby incorporated by reference herein.

The present invention generally concerns a tube for a microscope, and particularly concerns a tube a microscope where the tube has an adaptation interface, a rotatably arranged operator interface, a beam deflecting device having a beam-splitting assembly, and a rotatably arranged beam deflecting unit, a light beam coming from the adaptation interface being deflectable with the beam deflecting device in the direction of the rotatably arranged beam deflecting unit, a rotation of the operator interface being constrainedly coupled to a rotation of the rotatably arranged beam deflecting unit.

BACKGROUND

Tubes for microscopes have been known for some time from the existing art, and because of the property of a rotatably arranged operator interface are also called "ergonomic" tubes. An "operator interface" is to be understood for purposes of the present invention as the part of the tube that serves for viewing by the microscope operator. The operator interface is arranged rotatably so that a microscope operator can, for example, adjust the viewing angle individually to his or her own needs. The rotatably arranged operator interface makes it possible to work ergonomically with the microscope, since the rotation angle is adjustable in user-specific fashion and the viewing height of the tube is thus adaptable to the particular user.

The beam deflecting device deflects a light beam coming from the adaptation interface in the direction of the rotatably arranged beam deflecting unit, so that the sequence of arrangement of these components in the tube is hereby defined. The beam deflecting device is thus arranged between the adaptation interface and the rotatably arranged beam deflecting unit. The rotatably arranged beam deflecting unit is arranged between the operator interface and the beam deflecting device.

Reference is made, purely by way of example, to EP 0 844 505 A2, which discloses a tube for a microscope. This tube is disadvantageous in that no possibility is provided therein for attaching a documentation unit, for example in the form of a TV camera or a photo device.

SUMMARY OF THE INVENTION

It is therefore an object of the present invention to provide a tube for a microscope that makes an optical documentation interface available.

The present invention provides a tube for a microscope, having an adaptation interface (2), a rotatably arranged operator interface (3), a beam deflecting device (4) and a rotatably arranged beam deflecting unit (5). A light beam coming from the adaptation interface (2) is deflectable with the beam deflecting device (4) in the direction of the rotatably arranged beam deflecting unit (5), a rotation of the operator interface (3) being constrainedly coupled to a rotation of the rotatably arranged beam deflecting unit (5). The beam deflecting device (4) comprises a beam-splitting assembly (6).

According to the present invention a documentation interface can be made available by providing a beam split in the context of the beam deflecting device. A beam split at this point in the tube has almost no influence on the further optical beam path of the rotatably arranged operator interface, so that in advantageous fashion, the ergonomic functionality of the tube according to the present invention is ensured. Since there is no movement of the optical beam path or light beam in the region of the beam deflecting device as a result of a rotation of the operator interface, it is possible in additionally advantageous fashion to produce a beam split using means of simple design, since the beam-splitting assembly does not need to be adapted to a movably arranged beam path.

The beam-splitting assembly ultimately makes available in the tube a split-off optical beam path that can be directed to a documentation interface provided on the tube. A TV camera or a photographic unit, for example, could then be adapted onto that documentation interface. It is thus advantageously possible both for the microscope operator to examine the specimen by looking into the tube, and for an examined specimen to be documented, for example by acquisition of a specimen image using a TV or CCD camera adapted on the documentation interface.

The light beam coming from a microscope objective of the microscope usually extends to the tube in a vertical direction. If the tube is adapted on an upright microscope, the light beam coming from the specimen and from the microscope objective extends in a vertical direction upward. In the case of an inverted microscope, conversely, the light beam coming from the specimen initially extends vertically downward. The light beam is then deflected so that it extends vertically upward to an adaptation interface. In an embodiment, provision is therefore initially made for deflecting the light beam coming from the microscope objective and from the adaptation interface. In a preferred embodiment, the beam deflecting device encompasses for this purpose a deflecting prism with which the light beam is preferably deflected 90 degrees. A mirror could also be provided instead of the deflecting prism. The optical axis of the deflected light beam then accordingly extends in a horizontal plane. The deflecting prism of the beam deflecting device is preferably arranged in such a way that the deflected light beam extends away from the microscope operator, i.e. toward the side of the microscope facing away from the operator.

Concretely, the beam deflecting device encompasses a Bauernfeind prism in which the light beam coming from the adaptation interface is preferably reflected twice. A Bauernfeind prism is an optical component that achieves two internal reflections in a very small volume. Two reflections in one component are advantageous because preferably only an even number of reflections (i.e. 0, 2, 4, . . . ) must be provided so that a microscope image that is familiar—i.e. laterally correct—can be presented to the microscope operator. Together with the reflections at the rotatably arranged beam deflecting unit and at the deflecting prism, the result is thus four reflections. A compact design for the tube according to the present invention is thus hereby made possible.

The Bauernfeind prism is preferably arranged between the deflecting prism of the beam deflecting device and the rotatably arranged beam deflecting unit. Concretely, the light beam extending vertically from the microscope objective and from the adaptation interface could thus be deflected 90 degrees by the deflecting prism. This deflected light beam then passes through the Bauernfeind prism arranged after the deflecting prism, the light beam being in this context reflected twice in the Bauernfeind prism and then directed to the rotatably arranged beam deflecting unit. The optical beam path is configured here in such a way that in no position of the rotatably arranged beam deflecting unit does the light beam coming from the Bauernfeind prism exhibit an angle between the incident and emerging beam that becomes greater than 110 degrees.

In a preferred embodiment, an optical component is associated with the Bauernfeind prism. With this optical component, at least a part of the light beam coming from the adaptation interface is split off to a documentation interface and/or to a detector. The optical component, in combination with the Bauernfeind prism, thus forms a beam-splitting assembly. The optical component is preferably embodied as a prism that is cemented onto the Bauernfeind prism. This is therefore a join between two optical components that is usual in optics, and that can be implemented using means of relatively simple design. As a result of the concrete configuration of the optical join of the prism to the Bauernfeind prism, a splitting ratio can at the same time be established between the light beam split off to the documentation interface and the light beam directed to the rotatably arranged beam deflecting unit. A splitting ratio of 1:1 could, for example, be implemented. This is ensured concretely by the fact that prior to the cementing operation, an appropriate interference coating is applied onto the Bauernfeind prism at the point of subsequent joining.

The individual components of the beam deflecting device are preferably embodied in the form of prisms, i.e. are made of glass. In a preferred embodiment, provision is made for selecting the optical properties of the beam deflecting device in such a way that the length of the optical path of the beam in the tube is thereby adaptable. A shorter optical path between the other optical components in the tube can hereby be attained, making possible—in advantageous fashion—an even more compact design.

In some applications it is necessary to direct all of the light coming from the specimen to the microscope operator's eye. On the other hand, it can likewise be necessary to direct all of the light coming from the specimen to a documentation interface or to a CCD camera, in particular for applications with low specimen light intensity, e.g. fluorescence microscopy. For this instance, provision is made in an embodiment for the beam splitter device, or at least an assembly of the beam splitter device, to be conveyable out of its working position.

If the beam splitter device—i.e., for example, the Bauernfeind prism and the optical component associated with the Bauernfeind prism—is conveyed out of its working position, another optical component, or a deflecting element that directs the light beam either to the documentation interface or to the operator interface of the tube, is introduced in its place. Preferably the entire beam splitter device—i.e., for example, the Bauernfeind prism and the optical component associated with the Bauernfeind prism—is conveyed out of its working position and another optical component made of glass, e.g. a glass block, which directs the light beam coming from the adaptation interface to the documentation interface, is brought in instead of it. In this context, the other optical component is embodied in such a way that the optical path traveled therein by the light beam corresponds substantially to the optical path traveled by the light beam in the entire beam splitter device.

In an embodiment, the beam splitter device comprises a Bauernfeind prism and a prism cemented to the Bauernfeind prism, the common surface of the Bauernfeind prism and the prism being equipped with a coating that implements a splitting ratio of 1:1. The beam splitting device is arranged displaceably in a direction perpendicular to the optical axis and can be removed from the beam path, e.g. guided by a magazine guide. In a first position, the beam splitter device is located in the beam path, so that 50% of the light is directed to the operator interface and 50% of the light to the documentation interface. In a second position, the beam splitter device is removed from the beam path and in its place a Bauernfeind prism, which is reflectively coated on one side in such a way that all the light coming from the adaptation interface is reflected twice in the Bauernfeind prism and deflected to the operator interface, is introduced into the beam path. In a third position, a Bauernfeind prism and a prism are introduced into the beam path, the common surface of the Bauernfeind prism and the prism being embodied with a coating in such a way that the entire light beam passes through the two components without reflection and is directed to the documentation interface.

The state in which one part of the light beam is split off in the direction of the documentation interface, and the other part of the light beam in the direction of the operator interface, is recreated by introducing the beam splitter device, or at least an assembly of the beam splitter device, into its working position. Conveyance of the beam splitter into and out of the working position could be accomplished concretely by way of a magazine slider, which is used e.g. in conventional microscope tubes that do not comprise a rotatably arranged operator interface.

In a preferred embodiment, the operator interface and the rotatably arranged beam deflecting unit are rotatable about a rotation axis. The rotation axis is arranged perpendicular to the optical axis of the light beam extending in the tube. Because of the constrained coupling between the rotation of the operator interface and the rotation of the rotatably arranged beam deflecting unit, upon a rotation of the operator interface the light beam extending between the rotatably arranged beam deflecting unit and the operator interface is also rotated or pivoted. The light beam coming from the adaptation interface and extending to the rotatably arranged beam deflecting unit, on the other hand, is stationary. The optical axes of the light beams extending in the tube usually all lie in one plane, so that the rotation axis of the operator interface and of the rotatably arranged beam deflecting unit is arranged perpendicular to that plane. In an embodiment, the rotation axis is located at the point at which the optical axis of the light beam coming from the adaptation interface and extending to the rotatably arranged operator interface strikes the rotatably arranged beam deflecting unit. The rotatably arranged beam deflecting unit may be embodied in the form of a mirror. The rotation axis is then located in the mirror surface, specifically where the optical axis of the light beam extending from the adaptation interface to the mirror strikes the mirror.

In an embodiment, provision is made that upon a rotation of the operator interface through a definable angle, a rotation of the rotatably arranged beam deflecting unit through half that angle occurs. In other words, for example, the rotatably arranged beam deflecting unit is rotated 22.5 degrees when the operator interface is rotated 45 degrees. This constrained coupling between operator interface and rotatably arranged beam deflecting unit could be achieved, for example, using a linkage or gear system that has an appropriate reduction ratio.

The light beam coming from a microscope objective of the microscope usually takes the form of a so-called infinite beam. This is a substantially collimated beam shape that nevertheless diverges slightly. The slight divergence is attributable to the fact that the light proceeding from each specimen point is converted by the microscope objective into a collimated individual light beam. Since this applies to every specimen point in the specimen plane of the microscope objective, collimated individual light beams that diverge slightly in their propagation direction relative to one another—and, in particular for individual light beams extending in the field, with respect to the optical axis—are produced over the entire microscope objective pupil. Because of this beam divergence, the beam diameter becomes continually greater with increasing distance from the microscope objective, so that a compact design for the tube would not be possible if the beam shape were substantially unchanged. The term "light beam" hereinafter refers to the totality of all individual light beams extending from the microscope objective pupil.

In an embodiment, a lens device having positive refractive power, which preferably converts a substantially collimated light beam into a converging light beam, is therefore provided between the adaptation interface and the beam deflecting device. As a result, the light beam extending in the tube in any event no longer exhibits divergence, or the individual light beams extending at the outer edge just exhibit no further divergence, so that a compact design for the tube is advantageously attainable. The refractive power of the lens device is accordingly selected at least in such a way that the light beam extending in the tube just no longer diverges.

The tube according to the present invention is preferably embodied in such a way that the distance from the rotation axis to the operator interface has a value such that a rotation of the operator interface makes possible an ergonomic setting of the tube. That value is usually 20 to 40 centimeters. Provided between the rotatably arranged beam deflecting unit and the operator interface is a rotatably arranged further lens device that encompasses a lens having negative refractive power and a lens having positive refractive power. The lens having negative refractive power is dimensioned in such a way that it substantially collimates the light beam coming from the beam deflecting device, i.e. converts it into an infinite beam.

In an embodiment, as a result of the infinite beam path extending between the two lenses of the further lens device, an assembly of the tube is telescopable or can be pulled out. The telescopable assembly encompasses the lens having positive refractive power and the operator interface. The distance between the two lenses of the further lens device can thus be varied by pushing in or pulling out the assembly.

The assembly is preferably telescopable in the direction of the optical axis of the light beam extending in the assembly. Additional elements deflecting the light beam are thus not necessary. As a result of the telescopable assembly in combination with the rotatably arranged operator interface, the tube according to the present invention is, in advantageous fashion, individually adjustable to the requirements of an operator, a part of the light beam coming from the microscope being directed toward the documentation interface.

As already indicated, the operator interface is embodied in the form of a binocular element for eyepiece viewing by an operator. In this context, the two eyepieces can be varied in terms of their spacing from one another in ordinary fashion, so that the eyepieces for viewing can be adapted to the operator's interocular distance. This could be accomplished, for example, using the Siedentopf principle that is known from the existing art.

BRIEF DESCRIPTION OF THE DRAWINGS

There are various ways of advantageously embodying and developing the teaching of the present invention. The reader is referred, for that purpose, on the one hand to the claims subordinate to Claim 1, and on the other hand to the explanation below of a preferred exemplary embodiment of the invention with reference to the drawings. In conjunction with the explanation of the preferred exemplary embodiment of the invention with reference to the drawings, an explanation is also given of generally preferred embodiments and developments of the teaching.

DETAILED DESCRIPTION OF THE INVENTION

Figure 1:
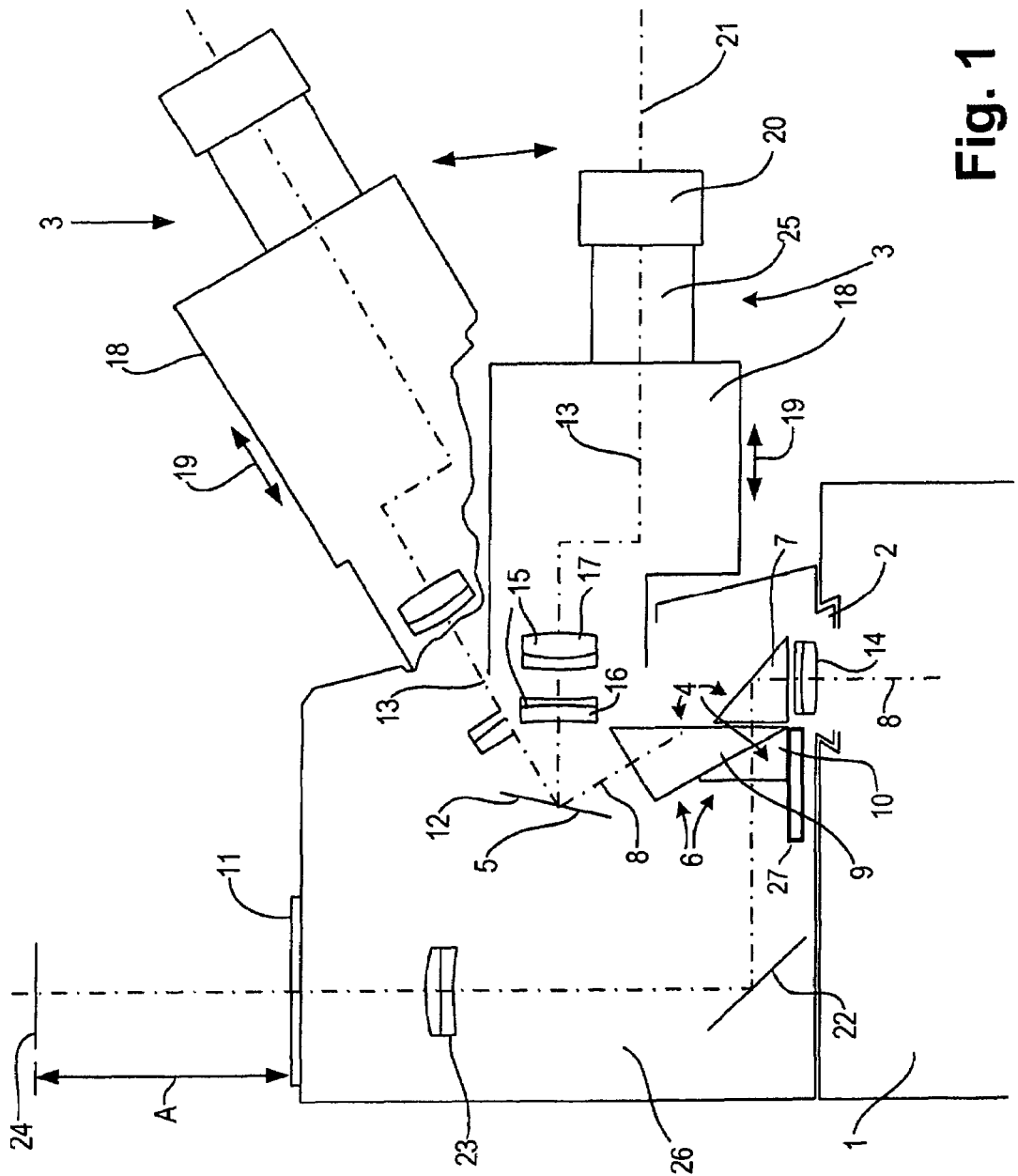
FIG. 1 is a schematic laterally sectioned depiction of an exemplary embodiment of a tube according to the present invention.

Tube 26 shown in FIG. 1 is provided for a microscope 1, shown only partially. The tube shown in FIG. 1 can thus be placed, in principle, on the tube changer of an inverted or an upright microscope. Tube 26 comprises an adaptation interface 2 for adapting the tube onto microscope 1. The tube furthermore encompasses a rotatably arranged operator interface 3 that is shown or indicated in two different rotational positions. The tube furthermore encompasses a beam deflecting device 4 that deflects a light beam coming from adaptation interface 2 in the direction of a rotatably arranged beam deflecting unit 5. A rotation of operator interface 3 is constrainedly coupled to a rotation of the rotatably arranged beam deflecting unit 5.

According to the present invention, beam deflecting device 4 comprises a beam-splitting assembly 6.

Beam deflecting device 4 encompasses a deflecting prism 7 with which the light beam coming from adaptation interface 2 is firstly deflected 90 degrees. Only optical axis 8 of this light beam is shown, using dashed lines. Beam deflecting device 4 furthermore encompasses a Bauernfeind prism 9 in which the light beam coming from adaptation interface 2 is reflected twice.

Bauernfeind prism 9 is arranged between deflecting prism 7 and rotatably arranged beam deflecting unit 5. Associated with Bauernfeind prism 9 is an optical component 10 with which at least a part of the light beam coming from adaptation interface 2 can be split off to a documentation interface 11. Optical component 10 is embodied here as a prism that is cemented onto Bauernfeind prism 9. Optical component 10 and Bauernfeind prism 9 together form beam-splitting assembly 6. Conveyance of beam splitting assembly 6 into and out of the working position is accomplished by way of magazine slider 27.

The rotatably arranged operator interface 3 and rotatably arranged beam deflecting unit 5 are rotatable about a common rotation axis 12. Rotation axis 12 is arranged perpendicular to optical axis 8 of the light beam coming from the adaptation interface. In addition, rotation axis 12 is arranged perpendicular to optical axis 13 of the light beam extending between the rotatably arranged beam deflecting unit and the rotatably arranged operator interface 3, i.e. perpendicular to the drawing plane in this depiction.

FIG. 1 shows operator interface 3 in two different angular positions. In the one position, the majority of optical axis 13 is arranged horizontally. Operator interface 3 is thus located at a rotation angle of 0 degrees. The second depiction of the operator interface shows it rotated 30 degrees about rotation axis 12, the angular position of rotatably arranged beam deflecting unit 5 corresponding to the second rotational position of operator interface 3. Upon a rotation of the operator interface through 30 degrees, a rotation of the rotatably arranged beam deflection thus occurs through 15 degrees in the same direction.

A lens device 14 having positive refractive power is provided between adaptation interface 2 and beam deflecting device 4. Lens device 14 converts the substantially collimated but slightly diverging light beam that passes from the microscope through adaptation interface 2—a so-called infinite beam—into a converging light beam. As a result, the optical components arranged after lens device 14 can be of smaller dimensions, making possible a compact design for tube 26 according to the present invention.

A rotatably arranged further lens device 15 is provided between beam deflecting device 4 and operator interface 3. This further lens device 15 encompasses a lens 16 having negative refractive power and a lens 17 having positive refractive power. A so-called infinite beam is present between lens 16 having negative refractive power and lens 17 having positive refractive power. An intermediate image 25 is also produced in rotatably arranged operator interface 3 by lens 17 having positive refractive power.

Tube 26 shown in FIG. 1 encompasses an assembly 18 that is arranged, together with lens 17 having positive refractive power and operator interface 3, in telescopable fashion. Assembly 18 is telescopable in the direction of optical axis 13 of the light beam extending in the assembly. This direction is indicated by way of double arrows 19.

Operator interface 3 shown at the angular position of 30 degrees is shown in a pulled out condition compared to operator interface 3 that is shown in the 0-degree position. This is evident from the increased spacing of the two lenses 16, 17 in the 30-degree angular position. The spacing of the two lenses 16, 17 in the 0-degree angular position, on the other hand, is smaller. In the exemplary embodiment shown in the single FIGURE, the telescopable assembly can be pulled out to a maximum of 30 cm.

Operator interface 3 is embodied in the form of a binocular element for eyepiece viewing by an operator, only one eyepiece 20 being shown because tube 26 is depicted in a lateral view in the single FIGURE. The exit pupil of eyepiece 20 is labeled with reference character 21.

The part of the light that passes through Bauernfeind prism 9 without deflection by optical component 10 is deflected 90 degrees by deflecting element 22, and passes through lens group 23 having positive refractive power, which produces an intermediate image 24. Located at a distance A from intermediate image 24 is documentation interface 11, onto which the TV adapter and camera adapter can be placed.

In conclusion, be it noted that the exemplary embodiment discussed above serves merely to describe the teaching claimed, but does not limit it to the exemplary embodiment.

PARTS LIST

1 Microscope
2 Adaptation interface
3 Rotatably arranged operator interface
4 Beam deflecting device
5 Rotatably arranged beam deflecting unit
6 Beam-splitting assembly
7 Deflecting prism
8 Optical axis of light beam coming from (2)
9 Bauernfeind prism
10 Optical component
11 Documentation interface
12 Rotation axis of (3) and (5)
13 Optical axis of light beam extending between (5) and (3)
14 Lens device
15 Further lens device
16 Lens of (15) having negative refractive power
17 Lens of (15) having positive refractive power
18 Telescopable assembly
19 Direction along which (18) is arranged telescopically
20 Eyepiece
21 Exit pupil of eyepiece of (3)
22 Deflecting element
23 Lens group having positive refractive power
24 Intermediate image
25 Intermediate image in (3)
26 Tube

What is claimed is:

1. A tube for a microscope, comprising:
   an adaptation interface configured to convey a light beam from the microscope along an optical axis;
   a rotatably disposed operator interface;
   a rotatably disposed beam deflecting unit disposed on a side of the optical axis opposite the operator interface, a rotation of the operator interface being constrainedly coupled to a rotation of the beam deflecting unit; and
   a beam deflecting device including a beam-splitting device, the beam splitting device including a Bauernfeind prism, the Bauernfeind prism being configured to reflect therein at least a portion of the light beam twice so as to deflect the at least a portion of the light beam to the beam deflecting unit, the Bauernfeind prism being disposed at a first distance perpendicular from an extension of the optical axis;
   wherein the optical axis is defined by a path of the light beam between the microscope and the beam deflection device; and
   wherein an axis of rotation of the beam deflecting unit is disposed at a second distance perpendicular from the extension of the optical axis, the second distance being greater than the first distance.

2. The tube as recited in claim 1 wherein the beam deflecting device includes a deflecting prism.

3. The tube as recited in claim 2 wherein the deflecting prism is configured to deflect by 90 degrees the light beam coming from the adaptation interface.

4. The tube as recited in claim 1 wherein the beam deflecting device includes a deflecting prism configured to deflect by 90 degrees the light beam coming from the adaptation interface, and wherein the Bauernfeind prism is disposed between the deflecting prism and the beam deflecting unit.

5. The tube as recited in claim 4 wherein the beam-splitting device includes an optical component associated with the Bauernfeind prism, the optical component being configured to split the light beam coming from the adaptation interface into first and second partial beams.

6. The tube as recited in claim 5 wherein the optical component includes a prism attached to the Bauernfeind prism.

7. The tube as recited in claim 6 wherein the prism is cemented to the Bauernfeind prism.

8. The tube as recited in claim 1 wherein optical properties of the beam deflecting device are selectable so that a length of an optical path of the light beam in the tube is adaptable.

9. The tube as recited in claim 1 wherein at least a portion of the beam splitter device is movable into and out of a working position.

10. The tube as recited in claim 9 wherein the at least a portion of the beam splitter device is movable into and out of the working position guided by a magazine slider.

11. The tube as recited in claim 1 wherein the operator interface and the beam deflecting unit are rotatable about a rotation axis, the rotation axis being perpendicular to the optical axis of the light beam.

12. The tube as recited in claim 1 wherein, upon a rotation of the operator interface through a first angle, the beam deflecting unit is configured to rotate through a second angle half as large as the first angle.

13. The tube as recited in claim 1 further comprising a lens device disposed between the adaptation interface and the beam deflecting device, the lens device having a positive refractive power.

14. The tube as recited in claim 13 wherein the lens device is configured to convert a substantially collimated light beam into a converging light beam.

15. The tube as recited in claim 1 further comprising a lens device rotatably disposed between the beam deflecting unit and the operator interface, the lens device including a first lens having a negative refractive power and a second lens having a positive refractive power.

16. The tube as recited in claim 15 wherein the first lens is configured to substantially collimate a light beam coming from the beam deflecting device.

17. The tube as recited in claim 16 further comprising a telescopable assembly telescopable in a direction of an optical axis of a light beam extending therein, the second lens and the operator interface being included in the telescopable assembly.

18. The tube as recited in claim 1 wherein the operator interface includes a binocular element configured for eyepiece viewing by an operator.

19. The tube as recited in claim 1 wherein the beam-splitting device is configured to split off a first portion of the light beam coming from the adaptation interface to at least one of a documentation interface and a detector.

20. The tube as recited in claim 19 wherein the beam-splitting device includes an optical component associated with the Bauernfeind prism, the optical component being configured to split off the first portion of the light beam to at least one of the documentation interface and the detector.

21. The tube as recited in claim 20 wherein the optical component includes a prism attached to the Bauernfeind prism.

22. The tube as recited in claim 21 wherein the prism is cemented to the Bauernfeind prism.

* * * * *